United States Patent [19]

Limerick et al.

[11] Patent Number: 5,444,973

[45] Date of Patent: Aug. 29, 1995

[54] PRESSURE-FED ROCKET BOOSTER SYSTEM

[75] Inventors: Charles D. Limerick, Palm Beach Gardens; James R. Brown, Jupiter, both of Fla.

[73] Assignee: United Technologies Corporation, Hartford, Conn.

[21] Appl. No.: 166,425

[22] Filed: Dec. 13, 1993

[51] Int. Cl.⁶ .................................................. F20K 9/00
[52] U.S. Cl. ............................................ 60/204; 60/257; 60/259
[58] Field of Search ................ 60/204, 257, 259, 206, 60/207; 244/135 R

[56] References Cited

U.S. PATENT DOCUMENTS

| | | | |
|---|---|---|---|
| 4,879,874 | 11/1989 | Koyari et al. | 60/259 |
| 4,880,185 | 11/1989 | Apfel | 244/135 B |
| 5,074,762 | 12/1991 | Mechin | 417/409 |
| 5,267,437 | 12/1993 | Foust | 60/206 |

*Primary Examiner*—Richard A. Bertsch
*Assistant Examiner*—Howard R. Richman

[57] ABSTRACT

Disclosed is a space launch system having a main engine which uses turbopumps to provide fuel and oxidizer to the main engine combustion chamber, and one or more booster engines that use high pressure fuel and/or oxidizer to pressurize the fuel and oxidizer tanks of the booster engine to obtain the pressure differential necessary to drive fuel and oxidizer from the fuel and oxidizer tanks of the booster engine to the combustion chamber of the booster engine.

13 Claims, 1 Drawing Sheet

PRESSURE-FED ROCKET BOOSTER SYSTEM

FIELD OF THE INVENTION

This invention relates to space launch vehicle systems, and specifically to such systems having a main rocket engine and one or more booster rocket engines.

BACKGROUND OF THE INVENTION

Space launch vehicles typically use cryogenic propellants, such as liquid hydrogen and liquid oxygen due to the high efficiency provided in terms of thrust-to-weight ratios. In the main engine of typical hydrogen-fueled rockets, liquid hydrogen is heated, vaporized, and fed to the main combustion chamber by a fuel turbopump. Liquid oxygen is likewise fed to the main combustion chamber by an oxidizer turbopump which may or may not be driven by the same shaft as the fuel turbopump. The power to run the fuel and oxidizer turbopumps is supplied by a turbine which is driven by the high pressure hydrogen gas that has been vaporized in a heat exchanger which surrounds the main combustion chamber. The fuel and oxidizer turbopumps thereby provide the necessary flow rates of fuel and oxidizer needed to produce the desired thrust in the main rocket engine.

Because turbopumps add greatly to the cost and complexity of a rocket engine, some rocket engines simply utilize a pressurized gas source such as helium to pressurize the liquid hydrogen and liquid oxygen tanks. The flow of hydrogen and oxygen to the engine can then be controlled by incorporating a valve into each of the flow lines which connect the combustion chamber to the hydrogen tank or oxygen tank. This latter design is commonly used on booster engines since it avoids the need for costly turbopumps. The drawback of the helium pressurized rocket system is the significant weight penalty incurred through the use of the large, heavy helium tank.

For an earth-to-orbit space launch vehicle, several helium pressurized booster rockets may be "strapped" to a turbopump pressurized main rocket engine. The sum of the weight penalties incurred by each of the helium pressurized booster rockets is substantial as compared to the payload which can be lifted by the space launch vehicle. If the need for the helium tanks in each of the booster engines could be eliminated, a greater payload could be carried by the space launch vehicle.

What is needed is a space launch system in which the booster rockets' tanks of helium can be eliminated without incurring the cost and complexity of incorporating turbopumps into the booster rockets.

DISCLOSURE OF THE INVENTION

It is therefore an object of the present invention to provide a space launch system having a main rocket engine and booster rocket engines, which space launch system eliminates the need for pressurization tanks on each booster rocket.

Another object of the present invention to provide a space launch system having a main rocket engine and booster rocket engines, which space launch system eliminates the need for turbopumps on each booster rocket.

Accordingly, the preferred embodiment disclosed herein is a space launch system having a main engine which uses turbopumps to provide fuel and oxidizer to the main engine combustion chamber, and one or more booster engines that use vaporized high pressure fuel and/or oxidizer to pressurize the fuel and oxidizer tanks of the booster engine to obtain the pressure differential necessary to drive fuel and oxidizer from the fuel and oxidizer tanks of the booster engine to the combustion chamber of the booster engine. An alternate embodiment is also disclosed in which the oxidizer of the main rocket engine is fed directly to the combustion chamber of the booster engine.

The foregoing and other features and advantages of the present invention will become more apparent from the following description and accompanying drawings.

BRIEF DESCRIPTION OF THE DRAWINGS

FIG. 2 is a schematic drawing of an alternate embodiment of the pressure-fed booster rocket engine system of the present invention.

BEST MODE FOR CARRYING OUT THE INVENTION

Figure 1:
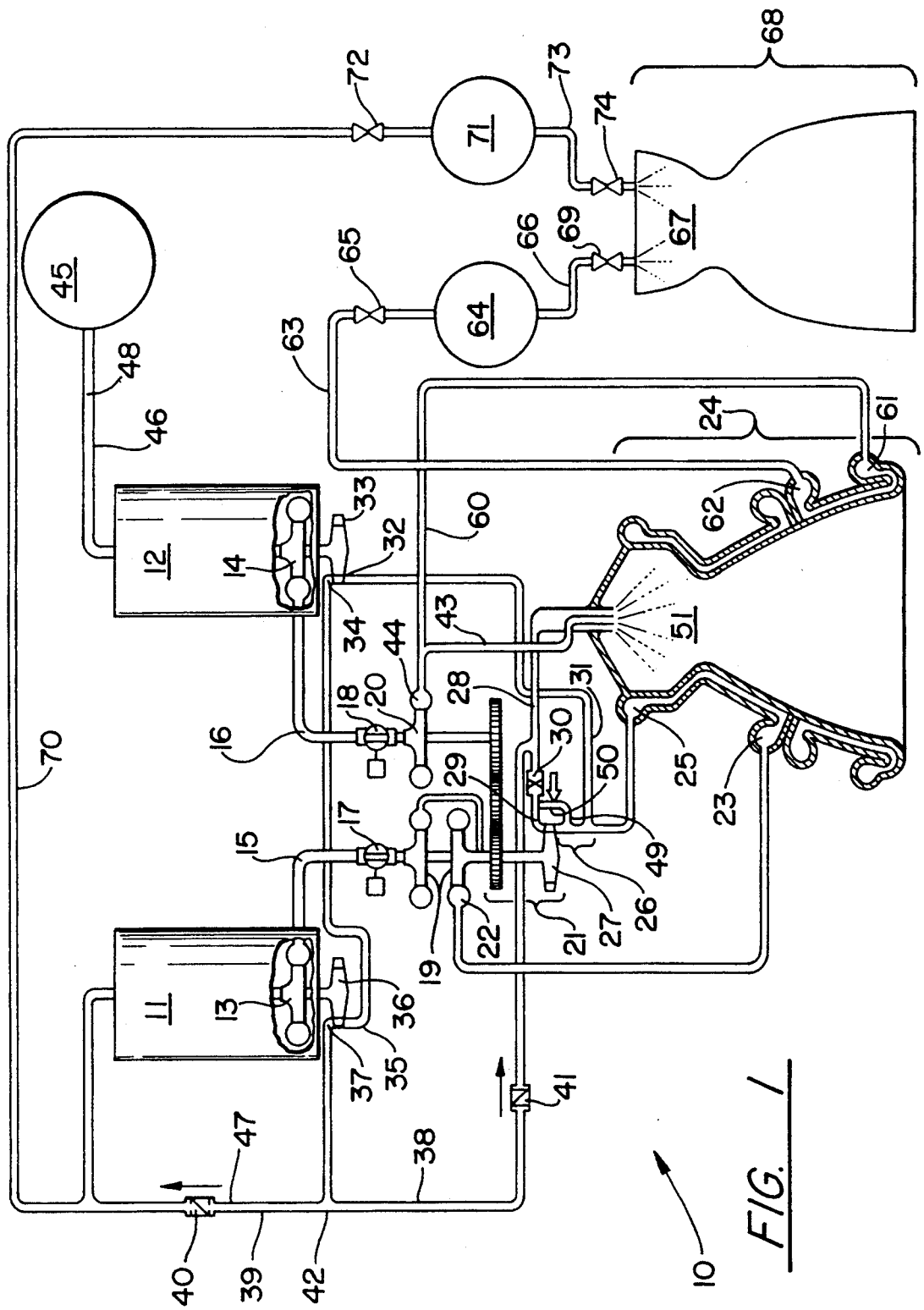
FIG. 1 is a schematic drawing of the preferred embodiment of the pressure-fed booster rocket engine system of the present invention.

FIG. 1 shows the preferred embodiment of a main rocket engine 10 incorporating the pressure-fed rocket booster system of the present invention. The present invention is shown and described in terms of the expander cycle rocket engine disclosed in U.S. Pat. No. 5,267,437 entitled "Dual Mode Rocket Engine" issued Dec. 7, 1993 to Foust and assigned to the same assignee as the present application, but those skilled in the art will readily appreciate that the pressure-fed rocket booster system of the present invention can be used with any expander cycle rocket engine in which propellants are vaporized and available to use as a pressure source for the booster engine propellants.

The main rocket engine 10 has two cryogenic propellant tanks, one 11 containing cryogenic fuel and the other 12 containing cryogenic oxidizer. Each tank 11, 12 has a boost pump 13, 14 for pumping propellant from the tanks into supply lines 15, 16 to supply cryogenic fuel and cryo oxidizer to the primary fuel pump and the primary oxidizer pump, respectively. Each of the supply lines 15, 16 includes a shutoff valve 17, 18 to initiate or terminate the flow of propellant therethrough. The primary pumps 19, 20 are driven by a single drive means 21 such as a turbine and gear assembly which fixes the ratio between the two primary pumps 19, 20 to provide the desired fuel-to-oxidizer ratio of propellants to the main engine 10. (Series turbines for the two pumps and individual flow controls are an alternative, equally appropriate for this invention.) The discharge of the primary fuel pump 22 is connected to the fuel inlet 23 of the regeneratively cooled thrust chamber/nozzle assembly 24. The fuel discharge 25 of the regeneratively cooled thrust chamber/nozzle assembly 24 is connected to a primary turbine inlet 26 adjacent the primary turbine 27 to provide vaporized fuel propellant as the working fluid to drive the primary turbine 27.

A primary turbine discharge line 28 connected to the outlet 29 of the primary turbine 27 provides vaporized fuel propellant to the main combustion chamber 51. The primary turbine discharge line 28 includes a turbine flow shutoff valve 30 for initiating or terminating the flow of vaporized fuel propellant through the primary turbine 27. A boost pump turbine supply line 31 connected between the primary turbine inlet 26 and the turbine inlet 32 of one of the boost pumps, preferably the oxidizer boost pump turbine 33, provides vaporized fuel propellant thereto as working fluid.

The discharge 34 of the oxidizer boost pump turbine 33 is connected to the turbine inlet 35 of the fuel boost pump turbine 36 to provide vaporized fuel propellant thereto. The discharge 37 of the fuel boost pump turbine 36 is connected by the fuel boost pump turbine discharge line 38 to the primary turbine discharge line 28 downstream of the turbine flow control valve 30. A fuel tank pressurization line 39 which branches off the boost pump turbine discharge line 38 maintains pressure of the propellant within the fuel tank 11. A first check valve 40 in the fuel pressurization line 39 prevents flow out of the fuel tank 11 through the fuel pressurization line 39. A second check valve 41 in the boost pump turbine discharge line 38 downstream of the fuel pressurization line junction 42 prevents back-flow of cryogenic fuel from the primary turbine discharge line 28 through the boost pump turbine discharge line 38.

A primary oxidizer pump discharge line 43 connects the primary oxidizer pump discharge to the main combustion chamber 51 to provide oxidizer thereto. Pressure in the cryogenic oxidizer tank 12 is maintained by a pressure source, such as a tank 45 containing helium, connected to the cryogenic oxidizer tank 12 by an oxidizer pressurization line 46. Orifices 47, 48 in the pressurization lines 39, 46 limit the rate at which the propellant tanks 11, 12 can be pressurized. In the preferred embodiment, a primary turbine bypass line 49 connects the primary turbine inlet 26 to the primary turbine discharge line 28 upstream of the turbine flow control valve 30. The bypass line 49 includes a controller 50 to selectively control thrust during main engine operation.

The preferred embodiment additionally includes a main oxidizer supply line 60 connected to the primary oxidizer pump discharge line 43 for supplying a portion of the cryogenic oxidizer to the oxidizer inlet 61 of the regeneratively cooled combustion chamber/nozzle assembly 24 of the main engine 10. The oxidizer discharge 62 of the regeneratively cooled thrust chamber/nozzle assembly 24 is connected by a booster oxidizer tank pressurization line 63 to a booster oxidizer tank 64 containing booster oxidizer. The booster oxidizer tank pressurization line 64 includes a valve 65 for controlling the pressurization rate of the booster oxidizer tank. The main oxidizer supply line 60, the oxidizer inlet 61, the booster oxidizer tank pressurization line 63, the booster oxidizer tank 64, and the valve 65 constitute the booster oxidizer tank pressurization circuit. The booster oxidizer supply line 66 connects the booster oxidizer tank 63 to the booster combustion chamber 67 located in the booster engine combustion chamber/nozzle assembly 68. The booster oxidizer supply line 66 includes an oxidizer control valve 69 for modulating the flow of booster oxidizer to the booster combustion chamber 67.

The booster fuel tank pressurization line 70 is connected to the fuel discharge 25 of the regeneratively cooled thrust chamber/nozzle assembly 24 via the boost turbine supply line 31 and the cryogenic fuel tank pressurization line 39. The booster fuel tank pressurization line 70 is also connected to the booster fuel tank 71, and the booster fuel tank pressurization line 70 includes a valve 72 for controlling the pressurization rate of the booster fuel tank 71. The booster fuel tank 71 contains a booster fuel that is preferably a liquid hydrocarbon, such as kerosene. A booster fuel supply line 73 connects the booster fuel tank 71 to the booster combustion chamber 67, and the booster fuel supply line 73 includes a fuel control valve 74 for modulating the flow of booster fuel from the booster fuel tank 71 to the booster combustion chamber 67.

In operation, the main engine start-up is initiated by opening the propellant valves 17, 18. The cryogenic oxidizer flows from the oxidizer boost pump 14 through the primary oxidizer pump 20 to the combustion chamber/nozzle assembly 24, driven by the pressure differential between the oxidizer tank 12 and the combustion chamber 51, since the pressure in the cryogenic oxidizer tank 12 is maintained at a high pressure by the pressure source 45. The cryogenic fuel flows from the fuel boost pump 13 through the primary fuel pump 19 to the regeneratively cooled thrust chamber/nozzle assembly 24. During the initial portion of main engine start-up, the turbine flow control valve 30 is closed, forcing the fuel to bypass the primary turbine 27. Thus, the primary pumps 19, 20 do not operate at the beginning of the main engine start-up. The ambient temperature of the regeneratively cooled combustion chamber/nozzle assembly 24, provides an adequate heat source for vaporizing the cryogenic fuel prior to the fuel flowing through the boost pump turbines 33, 36, thereby driving the boost pumps 13, 14. A portion of the vaporized fuel then flows to the main combustion chamber 51 where the propellants are ignited. The combustion process in the main combustion chamber provides a heat source, and some of the combustion heat is absorbed by fuel flowing through the regeneratively cooled combustion chamber/nozzle assembly 24, increasing the vaporization rate, temperature and pressure of the fuel therein and providing additional energy to drive the boost pump turbines 33, 36. As the fuel boost pump 13 produces pressure, a portion of the fuel leaving the fuel boost pump turbine 36 is diverted via the fuel tank pressurization line 39 through the fuel tank check valve 40 to maintain pressure in the cryogenic fuel tank 11.

Once the primary pumps 19, 20 have been sufficiently cooled down by the flow of propellant therethrough, the turbine flow control valve 30 is opened. This allows vaporized fuel to flow through the primary turbine 27 in addition to the boost pump turbines 33, 36, thereby driving the primary pumps 19, 20, which pump the cryogenic fuel and cryogenic oxidizer to pressures significantly higher than the pressure the propellant tanks 11, 12, 64, 71. Increasing pressure in the cryogenic fuel system causes check valve 41 to close, as those skilled in the art will readily appreciate, diverting all of the fuel flow from the fuel boost pump turbine 36 into the cryogenic fuel tank pressurization line 39. The closing of check valve 41 represents the completion of the start-up cycle of the main engine.

When the vaporized fuel in the cryogenic fuel tank pressurization line 39 is at a pressure significantly higher than the ambient pressure in the booster combustion chamber 67, operation of the booster engine is initiated by opening the valves 65, 72. Opening valve 65 allows a portion of the cryogenic oxidizer from the cryogenic oxidizer tank 12 to flow through the main oxidizer supply line 60 to the oxidizer inlet 61 of the regeneratively cooled combustion chamber/nozzle assembly 24 of the main engine 10. Within the regeneratively cooled combustion chamber/nozzle assembly 24 the portion of cryogenic oxidizer is vaporized at a pressure significantly greater than the ambient pressure in the booster combustion chamber 67. The vaporized oxidizer is then delivered through the booster oxidizer tank pressurization line 63 to the booster oxidizer tank 64, pressurizing the booster oxidizer tank 64 to a pressure significantly greater than the ambient pressure in the booster combustion chamber 67. Opening valve 72 delivers the vaporized fuel to the booster fuel tank 71 thereby pressurizing the booster oxidizer tank to a pressure greater than the ambient pressure in the booster combustion chamber 67. Valves 69, 74 are then opened, and due to the fuel pressure differential between the pressurized booster fuel tank 71 and the ambient pressure in the booster combustion chamber 67, booster fuel is driven from the booster fuel tank 71 through the fuel supply line 73 to the booster combustion chamber 67. Likewise, due to the oxidizer pressure differential between the pressurized booster oxidizer tank 64 and the ambient pressure in the booster combustion chamber 67, booster oxidizer is driven from the booster oxidizer tank 64 through the oxidizer supply line 66 to the booster combustion chamber 67. The booster fuel and booster oxidizer are then combusted in the booster combustion chamber 67 as long as the thrust from the booster rocket engine is needed.

An alternate embodiment of the present invention is shown in FIG. 2. The alternate embodiment is similar to the preferred embodiment except that the booster oxidizer tank pressurization circuit has been eliminated, and the booster oxidizer supply line 66 is connected directly to the primary oxidizer pump discharge line 43 instead of being connected to the booster oxidizer tank 64 as in the preferred embodiment. Accordingly, the pressure of the cryogenic oxidizer in the oxidizer supply line 66 is the same as the pressure of the cryogenic oxidizer in the primary oxidizer pump discharge line 43, a pressure significantly higher than ambient pressure in the booster combustion chamber 67. In the alternate embodiment, cryogenic oxidizer is pumped directly to the booster combustion chamber, and therefore regeneratively cooled combustion chamber/nozzle assembly 24 of the main engine needs only have the cooling path necessary to heat and vaporize the cryogenic fuel. The other components of the alternate embodiment, the booster combustion chamber 67, the booster engine combustion chamber/nozzle assembly 68, the oxidizer control valve 69, the booster fuel tank pressurization line 70, the booster fuel tank 71, the valve 72, the booster fuel supply line 73 and the booster fuel control valve 74, are the same as disclosed for the preferred embodiment.

In operation, main engine start-up is initiated and completed as described above for the preferred embodiment such that the vaporized fuel in the cryogenic fuel tank pressurization line 39 is at a pressure significantly higher than the ambient pressure in the booster combustion chamber 67. Operation of the booster engine is initiated by opening the valve 72, which delivers a portion of the vaporized fuel to the booster fuel tank 71 thereby pressurizing the booster fuel tank to a pressure greater than the ambient pressure in the booster combustion chamber 67, pressurizing the booster fuel tank 71 and providing a pressure differential between the pressure in the booster fuel tank 71 and the ambient pressure in the booster combustion chamber 67. The valves 69, 74 are then opened, and due to the pressure differential between the pressurized oxidizer supply line 66 and the ambient pressure in the booster combustion chamber 67, a portion of the cryogenic oxidizer is pumped from the cryogenic oxidizer tank 12 to the booster combustion chamber 67 through the booster oxidizer supply line 66. Likewise, due to the fuel pressure differential between the pressurized booster fuel tank 71 and the ambient pressure in the booster combustion chamber 67, booster fuel is driven from the booster fuel tank 71 through the fuel supply line 73 to the booster combustion chamber 67 using the fuel pressure differential. The booster fuel and booster oxidizer are combusted in the booster combustion chamber as long as the thrust from the booster rocket engine is needed.

Although this invention has been shown and described with respect to detailed embodiments thereof, it will be understood by those skilled in the art that various changes in form and detail thereof may be made without departing from the spirit and scope of the claimed invention.

We claim:

1. A method of delivering booster fuel and booster oxidizer from a booster fuel tank and a booster oxidizer tank, respectively, of a space launch vehicle's booster engine to a booster combustion chamber of the booster engine, said method comprising:

providing a main engine on said vehicle, said main engine including cryogenic fuel in a cryogenic fuel tank and cryogenic oxidizer in a cryogenic oxidizer tank, and a main combustion chamber/nozzle assembly having a main combustion chamber therein;

providing a booster fuel supply line connecting said booster fuel tank to said booster combustion chamber;

providing a booster oxidizer supply line connecting said booster oxidizer tank to said booster combustion chamber;

pumping said cryogenic fuel from said cryogenic fuel tank to a heat source;

pumping a first portion of said cryogenic oxidizer from said cryogenic oxidizer tank to said main combustion chamber;

pumping a second portion of said cryogenic oxidizer from said cryogenic oxidizer tank to said heat source;

heating and vaporizing said cryogenic fuel and said second portion of cryogenic oxidizer to a pressure greater than the ambient pressure within said booster combustion chamber;

delivering a first portion of the vaporized fuel to the main combustion chamber;

delivering a second portion of the vaporized fuel to the booster fuel tank at a pressure greater than ambient pressure in said booster combustion chamber to provide a fuel pressure differential between said pressure in said booster fuel tank and said ambient pressure in said booster combustion chamber;

delivering a third portion of the vaporized fuel to the cryogenic fuel tank to provide pressurization thereof;

delivering said second portion of vaporized oxidizer to the booster oxidizer tank at a pressure greater than ambient pressure in said booster combustion chamber to provide an oxidizer pressure differential between said pressure in said booster oxidizer tank and said ambient pressure in said booster combustion chamber;

combusting said first portion of vaporized fuel and said first portion of cryogenic oxidizer in said main combustion chamber; and, using the fuel pressure differential to drive the booster fuel from the booster fuel tank through the booster fuel supply line to the booster combustion chamber and using the oxidizer pressure differential to drive the booster oxidizer from the booster oxidizer tank through the booster oxidizer supply line to the booster combustion chamber.

2. A method of delivering booster fuel from a booster fuel tank of a space launch vehicle's booster engine to a booster combustion chamber of the booster engine, said method comprising:

providing a main engine on said vehicle, said main engine including cryogenic fuel in a cryogenic fuel tank and cryogenic oxidizer in a cryogenic oxidizer tank, and a main combustion chamber/nozzle assembly having a main combustion chamber therein;

providing a booster fuel supply line connecting said booster fuel tank to said booster combustion chamber;

providing a booster oxidizer supply line;

pumping said cryogenic fuel from said cryogenic fuel tank to a heat source;

heating and vaporizing said cryogenic fuel to a pressure greater than the ambient pressure within said booster combustion chamber;

delivering a first portion of the vaporized fuel to the main combustion chamber;

delivering a second portion of the vaporized fuel to the booster fuel tank at a pressure greater than ambient pressure in said booster combustion chamber to provide a fuel pressure differential between said pressure in said booster fuel tank and said ambient pressure in said booster combustion chamber;

delivering a third portion of the vaporized fuel to the cryogenic fuel tank to provide pressurization thereof;

pumping a first portion of said cryogenic oxidizer from said cryogenic oxidizer tank to said main combustion chamber;

pumping a second portion of said cryogenic oxidizer from said cryogenic oxidizer tank to said booster combustion chamber through said booster oxidizer supply line;

combusting said first portion of vaporized fuel and said first portion of cryogenic oxidizer in said main combustion chamber; and, using the fuel pressure differential to drive the booster fuel from the booster fuel tank through the booster fuel supply line to the booster combustion chamber.

3. A space launch vehicle comprising
a main engine including a main combustion chamber/nozzle assembly having a main combustion chamber therein, a main fuel tank containing cryogenic fuel at a pressure greater than ambient pressure, a main oxidizer tank containing cryogenic oxidizer at a pressure greater than ambient pressure, means for pumping said cryogenic fuel and cryogenic oxidizer from each of said tanks and delivering said cryogenic fuel and cryogenic oxidizer to said main combustion chamber, means for heating and vaporizing the cryogenic fuel prior to delivering the cryogenic fuel to the main combustion chamber, and means for heating and vaporizing a portion of the cryogenic oxidizer; and at least one booster engine including a booster combustion chamber/nozzle assembly having a booster combustion chamber located therein, a booster fuel tank containing booster fuel, and a booster oxidizer tank containing booster oxidizer, means for delivering a portion of said vaporized fuel from said main engine to said booster fuel tank to pressurize said booster fuel tank, means for delivering the portion of said vaporized oxidizer from said main engine to said booster oxidizer tank to pressurize said booster oxidizer tank, and means for delivering said pressurized booster fuel and pressurized booster oxidizer from said booster fuel tank and booster oxidizer tank, respectively, to said booster combustion chamber.

4. The space launch system of claim 3 wherein said means for delivering a portion of said vaporized fuel from said main engine to said booster fuel tank includes a booster fuel tank pressurization line connecting said means for heating and vaporizing the cryogenic fuel to the booster fuel tank, and said means for delivering said portion of said vaporized oxidizer from said main engine to said booster oxidizer tank includes a booster oxidizer tank pressurization line connecting said means for heating and vaporizing a portion of the cryogenic oxidizer to the booster oxidizer tank.

5. The space launch system of claim 4 wherein said booster fuel tank pressurization line includes a first valve for controlling the pressurization rate of the booster fuel tank.

6. The space launch system of claim 5 wherein said booster oxidizer tank pressurization line includes a second valve for controlling the pressurization rate of the booster oxidizer tank.

7. The space launch system of claim 6 wherein said means for delivering said pressurized booster fuel and pressurized booster oxidizer to said booster combustion chamber includes a booster fuel supply line connecting said booster fuel tank to the booster combustion chamber, and a booster oxidizer supply line connecting said booster oxidizer tank to the booster combustion chamber.

8. The space launch system of claim 7 wherein said booster fuel supply line includes a fuel control valve for modulating the flow of booster fuel to the booster combustion chamber, and said booster oxidizer supply line includes an oxidizer control valve for modulating the flow of booster oxidizer to the booster combustion chamber.

9. A space launch vehicle comprising
a main engine including a main combustion chamber/nozzle assembly having a main combustion chamber therein, a main fuel tank containing cryogenic fuel at a pressure greater than ambient pressure, a main oxidizer tank containing cryogenic oxidizer at a pressure greater than ambient pressure, means for pumping said cryogenic fuel from said cryogenic fuel tank and delivering said cryogenic fuel to said main combustion chamber, means for pumping said cryogenic oxidizer from said cryogenic oxidizer tank and delivering said cryogenic oxidizer to said main combustion chamber, and means for heating and vaporizing the cryogenic fuel prior to delivering the cryogenic fuel to the main combustion chamber; and at least one booster engine including a booster combustion chamber/nozzle assembly having a booster combustion chamber located therein, a booster fuel tank containing booster fuel, means for delivering a portion of said vaporized fuel from said main engine to said booster fuel tank to pressurize said booster fuel tank, means for delivering a portion of said cryogenic oxidizer from said main engine to said booster combustion chamber, and means for delivering said pressurized booster fuel from said booster fuel tank to said booster combustion chamber.

10. The space launch system of claim 9 wherein said means for delivering a portion of said vaporized fuel from said main engine to said booster fuel tank includes a booster fuel tank pressurization line connecting said means for heating and vaporizing the cryogenic fuel to the booster fuel tank, and said means for delivering a portion of said cryogenic oxidizer from said main engine to said booster combustion chamber includes a booster oxidizer supply line connecting said means for pumping said cryogenic oxidizer from said cryogenic oxidizer tank to the booster combustion chamber.

11. The space launch system of claim 10 wherein said booster fuel tank pressurization line includes a first valve for controlling the pressurization rate of the booster fuel tank.

12. The space launch system of claim 11 wherein said means for delivering said pressurized booster fuel to said booster combustion chamber includes a booster fuel supply line connecting said booster fuel tank to the booster combustion chamber.

13. The space launch system of claim 12 wherein said booster fuel supply line includes a fuel control valve for modulating the flow of booster fuel to the booster combustion chamber, and said booster oxidizer supply line includes an oxidizer control valve for modulating the flow of booster oxidizer to the booster combustion chamber.

* * * * *

UNITED STATES PATENT AND TRADEMARK OFFICE
CERTIFICATE OF CORRECTION

PATENT NO.   : 5,444,973
DATED        : August 29, 1995
INVENTOR(S)  : Charles D. Limerick, James R. Brown It is certified that error appears in the above-indentified patent and that said Letters Patent is hereby corrected as shown below:

On the title page, delete "13 Claims, 1 Drawing Sheet" and insert --13 Claims, 2 Drawing Sheets--.
Fig. 1, at the top of the Drawing Sheet, insert --Sheet 1 of 2--.
Insert the Drawing Sheet for Fig. 2 and label --Sheet 2 of 2--.

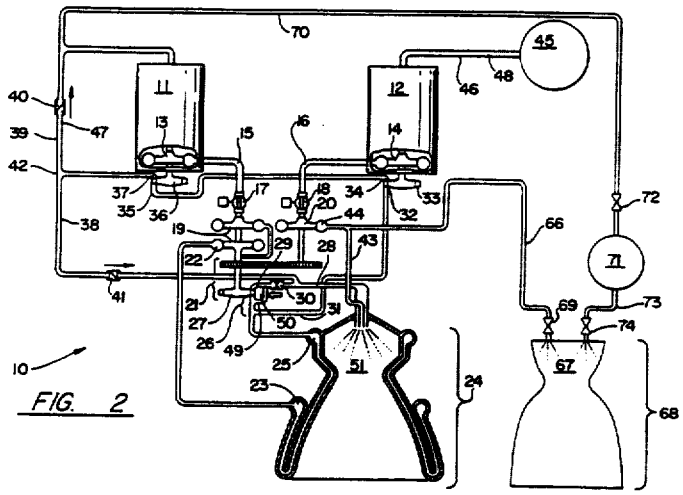

Signed and Sealed this

Twelfth Day of March, 1996

Attest:

BRUCE LEHMAN

Attesting Officer       Commissioner of Patents and Trademarks